Aug. 24, 1943.　　　J. B. MEEK　　　2,327,656
CONTAINER
Filed April 13, 1942
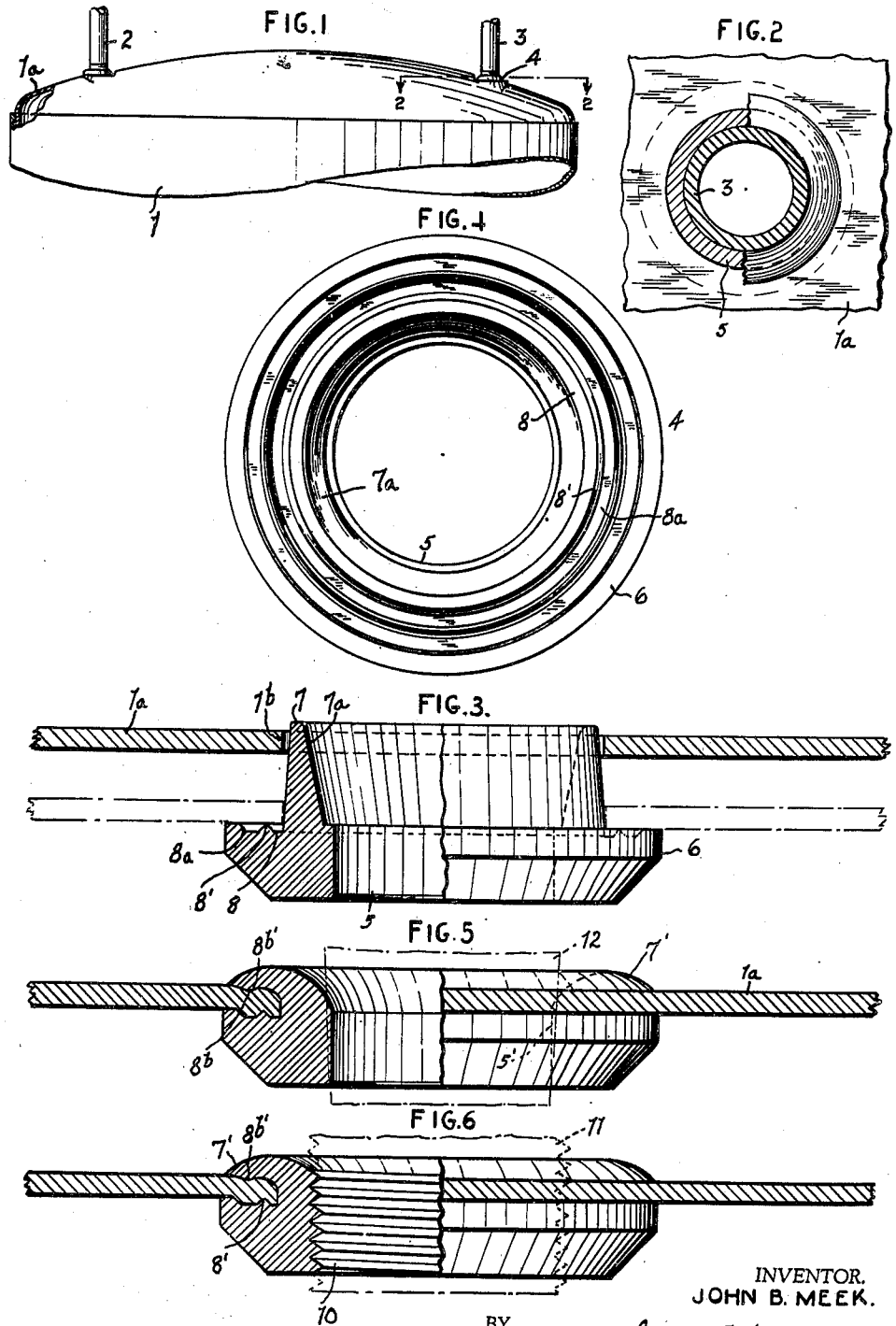
INVENTOR.
JOHN B. MEEK.
BY Geo. B. Pitts
ATTORNEY.

Aug. 24, 1943.  J. B. MEEK  2,327,656
CONTAINER
Filed April 13, 1942  2 Sheets-Sheet 2

INVENTOR.
JOHN B. MEEK.
BY Geo. B. Pitts
ATTORNEY

Patented Aug. 24, 1943

2,327,656

UNITED STATES PATENT OFFICE 2,327,656

CONTAINER

John B. Meek, Cleveland, Ohio, assignor to The Buckeye Forging Company, Cleveland, Ohio, a corporation of Ohio Application April 13, 1942, Serial No. 438,808

3 Claims. (Cl. 285—49)

This invention relates to a container or tank, more particularly to the fittings for the fluid inlet and outlet for the container and their mounting in the container walls. The disclosed embodiment of the invention is particularly advantageous for use as fittings between the inlet and outlet pipes and the container walls wherein the latter are many times daily subjected to internal expansion and contraction stresses, so that there is danger of these alternate stresses resulting in leakage, unless these fittings are sealed and interlocked in position. This invention relates to certain improvements in the type of fitting disclosed in Letters Patent No. 2,260,149 dated October 21, 1941.

In providing for sealed connections, it is also advantageous for economical reasons to provide for each inlet and outlet connection a fitting which eliminates welding as a securing means or repair means to insure sealing. In the disclosed embodiment, one operation only is required to mount the fitting in final sealed position. In this arrangement and method of mounting, it is of important to so shape the walls of the fitting that under the blow of the press plunger, in making the "pressed-in" operation, the "flow" of the metal of both the fitting and container wall, due to the peening or swaging of the walls of the fitting, is controlled, whereby those portions of the fitting and container wall, which are acted upon, affected and related resulting from the "pressed-in" operation, will assume a predetermined final, interlocked rigid relationship.

One object of the invention is to provide for a container an improved fitting and mounting therefor wherein provision is made to control the flow of the metal of the fitting and container wall to avoid abnormal distortion of either part when united in final relation.

Another object of the invention is to provide for a container an improved fitting and mounting therefor wherein the fitting is provided with a flange formed with inner and outer concentric recesses engaging one side of the container wall and a neck swaged over and upon the opposite side of the container wall and arranged to project the latter into said recesses, whereby the opposite sides of the container wall is interlocked between the recesses and outer side wall of the outer recess.

Another object of the invention is to provide in a container wall an improved bushing and mounting therefor wherein portions of the wall and bushing are interlocked to form a sealed joint and to incorporate with these portions means to prevent rotative movement of the bushing relative to the container wall.

Other objects of the invention will be apparent to those skilled in the art to which my invention relates from the following description taken in connection with the accompanying drawings, wherein Fig. 1 is a fragmentary elevation of a tank in which are mounted two fittings each embodying my invention.

Fig. 2 is a fragmentary section on the line 2—2 of Fig. 1.

Fig. 3 is a fragmentary view, partly in section illustrating the preliminary steps of mounting a fitting in a tank wall.

Fig. 4 is a plan view of the fitting.

Fig. 5 is a fragmentary view, partly in section with the tank and fitting in assembled relation.

Fig. 6 is a view similar to Fig. 5, but showing the bushing internally threaded.

Figure 7:
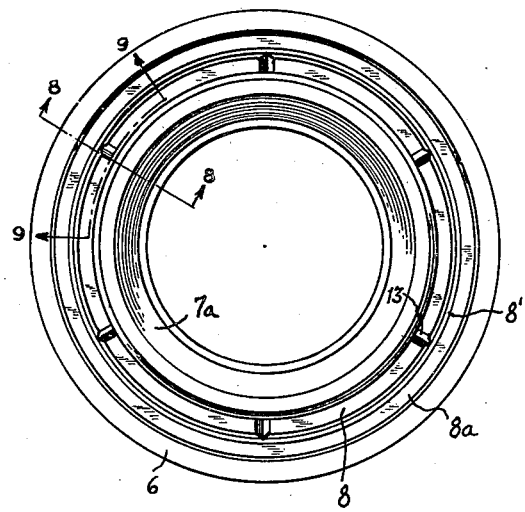
Fig. 7 is a plan view showing a modified form of fitting.

In the drawings, 1 indicates a tank which may be of any suitable construction, for holding a fluid. The tank shown for illustrative purposes consists of a storage tank for hot water, forming part of a hot water service system, the tank having an inlet pipe 2 for cold water leading from the city mains and an outlet pipe 3 for hot water leading to points of discharge. Each pipe 2, 3, is threaded into a bushing or fitting indicated as an entirety at 4, constructed and mounted in the wall 1a of the tank as hereinafter set forth. It will be understood that either or both pipes 2, 3, may be mounted in the side wall of the tank 1; likewise the tank may be provided with other bushings for a relief valve, drain pipe and pipes leading to and from the heating means (not shown) where the latter is not incorporated with the tank.

The fitting 4 preferably consists of a forging shaped to form an annular body portion 5, which is surrounded by a flange 6 and having a neck or collar 7 extending from the body portion on that side adjacent the face of the flange 6. The inner circumferential wall 7a of the neck 7 from the body portion 5 to its free end is inclined outwardly relative to the axis of the bushing so that it may be readily peened laterally as later set forth. The outer circumferential wall of the neck 7 from the flange 6 to its free end is inclined slightly inwardly relatively to the axis of the bushing to facilitate insertion of the neck 7 through the opening 1b in the tank wall 1a and the positioning of the latter against the flange 6.

It will be understood that the bushing 4 may be mounted in the wall 1a in either position, that is, with the flange 6 engaging the outer side of the wall or its inner side, the latter arrangement being chosen for illustration.

The flange 6 is formed with inner and outer annular recesses 8, 8a, respectively, having flat bottom walls and separated by a rib 8', the inner recess being adjacent to the neck 7 and connected thereto by a short radius. The side walls of the rib 8' are preferably inclined at substantially 45° angles and terminate in a relatively sharp edge.

The opening 1b in the tank wall 1a has a predetermined diameter which permits the walls of the opening to closely fit the lower portion of the outer wall of the neck 7, when carrying out the step of assembling the fitting 4 with the wall 1a, as shown in dotted lines in Fig. 3.

Next, the fitting 4 and wall 1a in their assembled relation are positioned in a suitable press between suitable dies carried by the anvil and the reciprocating member of the press, so that in the downward movement of the reciprocating member the neck 7 is peened over to the position shown in Figs. 5 and 6, against the opposite side of the wall 1a. In this operation, due to the pressure exerted by the dies in the down-stroke of the press reciprocating member, the peened over portion of the neck 7 serves to force the metal of the wall 1a, which has a substantially predetermined gage, into both recesses, with the rib 8' interlocked or pressed into the under side of the container wall, and expanded against the opposite side walls of both recesses, the outer recess permitting the container wall to be bent downwardly circumferentially between the rib 8' and outer side of the recess 8a, thereby forming on its upper side an annular groove 8b into which a portion of peened over neck projects, as shown at 8b' to provide an interlock between the neck and the container wall 1a. Due to the inclination of the inner wall of the rib 8' and the pressure transmitted through the peened over portion of the neck 7, the metal of the marginal portion of the container wall surrounding the opening 1b is forced both downwardly into the recess 8 and laterally inwardly against the wall of the neck. It will be observed that the pressure applied to the container wall 1a opposite the rib 8' effects a flow of the metal laterally both inwardly and outwardly relative to the rib so that the metal of the container wall is not only deflected or bent downwardly into the recess 8, 8a, but its molecular structure is broken down under the applied force to insure complete filling by and engagement under pressure of the metal with the walls of the recesses and area between the flange 6 and peened over wall. It will also be observed that in the final stage of applying the pressure, the projection 8b' co-acts with the outer side wall of the recess to crimp the metal between them to prevent metal flow laterally outwardly of the recess 8a, and thus insure that all of the metal of the container wall inwardly of the outer wall of the recess 8a is utilized and caused to completely fill the space between the flange 6 and peened over portion of the neck 7 and effect a liquid tight sealed relation under pressure between the walls of the fitting and container wall.

From the foregoing description it will be noted that by the formation in the flange 6 of inner and outer concentric recesses, the metal forming both the outer and inner sides or surfaces of the container wall 1a is deformed and interlocked under pressure to the walls of the fitting 4 to insure rigidity and a liquid sealed-tight joint.

Finally, screw threads 10 are tapped into the internal wall of the body portion 5, by a suitable tool indicated at 11 in dotted lines in Fig. 6. By preference, the body portion is provided with a tapered threaded internal wall, for which purpose such wall is first reamed out in any desired manner on the dotted line 5' (see Fig. 5) by a suitable tool 12 shown in dotted lines in Fig. 5.

Figure 8:
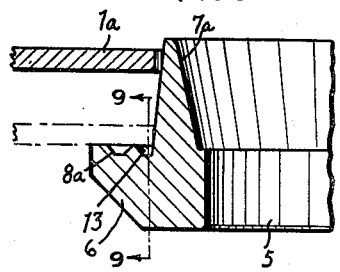
Fig. 8 is a fragmentary section, being a section on the line 8—8 of Fig. 7 and showing the preliminary step of mounting the fitting in a wall.
Figure 9:
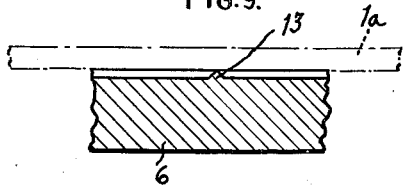
Fig. 9 is a fragmentary section on the line 9—9 of Figs. 7 and 8.
Figure 10:
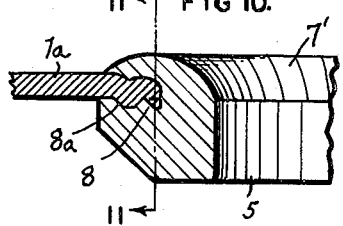
Fig. 10 is a fragmentary section showing the parts in assembled relation.
Figure 11:
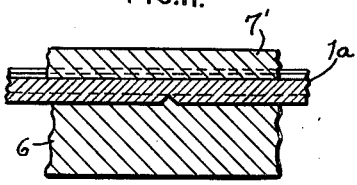
Fig. 11 is a fragmentary section on the line 11—11 of Fig. 10.

Figs. 7 to 11, illustrate a modified form of bushing and mounting wherein I provide within and throughout the recess 8 at uniformly spaced positions therein radially disposed inverted V-ribs 13 formed integrally with the walls of the recess when the bushing is forged, the recess and the ribs 13 being formed simultaneously with and as a part of the operation of forming the bushing. The ribs 13 project into the metal of the wall 1a due to the applied pressure between the press anvil and the press reciprocating member in the operation of peening the bushing collar or neck into its final position. As shown, the upper edges of the ribs 13 terminate in the plane of the face of the flange 6 and rib 8' and have a narrow width at their bases so as to form sharp upper or free edges for effecting indentation in the wall 1a without affecting the distortion or up-setting of the adjacent portions of the wall 1a to secure the interlock between it and the bushing. As the ribs extend to and are integral with the collar or neck 7, they do not prevent the assembly of the wall 1a and bushing with the side edge of the opening 1b in engagement with the bushing neck, so that the latter may act as an abutment for the wall to up-set the metal thereof during the peening operation, as already described. As the ribs 13 are forced into the wall 1a in and as a result of the peening step, the wall and bushing are locked together to resist turning of the bushing when a pipe or other device is screwed into the bushing or unscrewed therefrom, so that the rotative stresses are not at any time imparted to those portions of the bushing and wall which seal the joint between them, it being desirable to eliminate any strains which would affect the relation of these sealed together portions.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. A container having a sheet metal wall formed with an opening, a fitting comprising a body portion provided at one end with a circumferential flange in engagement with one side of said wall and a neck extending through said opening, said flange being formed with inner and outer annular recesses and a rib therebetween concentric to said neck, the outer end portion of said neck being swaged over into engagement with the opposite side of said container wall and serving to bend said wall over said rib and into said recesses, the bending of the container wall into the outer recess forming on its upper side between said rib and the outer wall of said outer recess an annular groove into which a portion of the swaged over neck projects, whereby said projecting portion of the neck co-acts with said rib and outer side wall of said outer recess to interlock the container wall to the walls of the fitting.

2. A container having a sheet metal wall formed with an opening, a fitting comprising a body portion provided at one end with a circumferential flange in engagement with one side of said wall and a neck extending through said opening, said flange being formed with an inner annular recess contiguous to said neck and an outer annular recess spaced from the periphery of said flange to provide an annular surface therearound, said recesses being concentric to said neck the wall between said recesses having substantially an inverted V-shape in cross section, the outer end portion of said neck being swaged over into engagement with the opposite side of said container wall into opposed relation to said surface and serving to bend the marginal portion of said wall inwardly of said surface over said rib and into said recesses, the bending of the wall into said outer recess forming on its upper side between said rib and the outer wall of said outer recess an annular groove into which a portion of the swaged over neck projects, whereby said projecting portion of the neck co-acts with said rib and the outer side wall of said outer recess to interlock the container wall to the walls of the fitting, the engagement of the neck with said annular surface serving to prevent metal flow outwardly of said outer recess.

3. A container having a sheet metal wall formed with an opening, a bushing comprising a body portion provided with a circumferential flange in engagement with one side of said wall and a neck extending through said opening, said flange being formed adjacent said neck with elongated recesses concentric thereto and in spaced end to end relation therearound and a continuous annular recess outwardly of and in concentric relation to said elongated recesses, the outer portion of said neck being swaged over into engagement with the opposite side of said container wall and serving to bend the latter into said elongated recesses and said annular recess to seal the joint and interlock the container wall and bushing, each wall between the adjoining elongated recesses comprising a radially disposed inverted V-rib arranged to project into the metal of the container wall to prevent rotative movement of the bushing relative to said wall.

JOHN B. MEEK.